(12) United States Patent
Gardner

(10) Patent No.: US 6,931,643 B2
(45) Date of Patent: Aug. 16, 2005

(54) INTERRUPT THROTTLING FOR INTER-PROCESSOR COMMUNICATIONS

(75) Inventor: Andrew J. Gardner, Goleta, CA (US)

(73) Assignee: Texas Instruments Incorporated, Dallas, TX (US)

( * ) Notice: Subject to any disclaimer, the term of this patent is extended or adjusted under 35 U.S.C. 154(b) by 862 days.

(21) Appl. No.: 09/822,940

(22) Filed: Mar. 30, 2001

(65) Prior Publication Data

US 2001/0037410 A1 Nov. 1, 2001

Related U.S. Application Data

(60) Provisional application No. 60/194,258, filed on Apr. 3, 2000.

(51) Int. Cl.[7] .................................................. G06F 3/00
(52) U.S. Cl. ...................... 719/313; 719/321; 710/260
(58) Field of Search ........................ 719/310–327; 710/260–269

(56) References Cited

U.S. PATENT DOCUMENTS

| 5,099,418 | A | * | 3/1992 | Pian et al. ................. 718/102 |
| 5,123,094 | A | | 6/1992 | MacDougall |
| 5,136,714 | A | * | 8/1992 | Braudaway et al. ........ 710/260 |
| 5,142,683 | A | * | 8/1992 | Burkhardt et al. .......... 709/215 |
| 5,202,998 | A | * | 4/1993 | Yanes ........................ 710/267 |
| 5,282,272 | A | * | 1/1994 | Guy et al. .................. 710/116 |
| 5,375,219 | A | * | 12/1994 | Okabe ....................... 711/147 |
| 5,835,779 | A | | 11/1998 | Chang et al. |
| 6,029,191 | A | | 2/2000 | Kurashima |
| 6,145,007 | A | * | 11/2000 | Dokic et al. ................ 709/230 |
| 6,154,785 | A | * | 11/2000 | Lakhat et al. .............. 719/310 |
| 6,513,070 | B1 | * | 1/2003 | Kozlowski et al. ......... 719/310 |
| 6,633,940 | B1 | * | 10/2003 | Alasti et al. ............... 710/262 |
| 6,711,643 | B2 | * | 3/2004 | Park et al. .................. 710/260 |
| 6,735,659 | B1 | * | 5/2004 | Nakanishi et al. .......... 710/305 |
| 2002/0178313 | A1 | * | 11/2002 | Gary ......................... 710/260 |

FOREIGN PATENT DOCUMENTS

EP        0 551 242 A2    7/1993
WO    WO 96/29656   *   9/1996  ......... G06F/15/167

OTHER PUBLICATIONS

Kranz, David et al. "Integrating Message–Passing and Shared–Memory: Early Experience." ACM 1993.*

* cited by examiner

*Primary Examiner*—Lewis A. Bullock, Jr.
(74) *Attorney, Agent, or Firm*—Ronald O. Neerings; Wade James Brady, III; Frederick J. Telecky, Jr.

(57) ABSTRACT

Implementation of communication between data processors includes a first task (A) running on a first data processor (11) determining that communication is desired between the first task and a second task (B) running on a second data processor (13). The first data processor interrupts the second data processor if the second task is blocked with respect to communication on a predetermined communication channel. If the second task is not blocked with respect to communication on the predetermined communication channel, the first data processor participates in the desired communication on the predetermined communication channel without interrupting the second data processor.

31 Claims, 4 Drawing Sheets

US 6,931,643 B2

INTERRUPT THROTTLING FOR INTER-PROCESSOR COMMUNICATIONS

This application claims the priority under 35 U.S.C. 119(e)(1) of copending U.S. provisional application No. 60/194,258 filed on Apr. 3, 2000, incorporated herein by reference.

FIELD OF THE INVENTION

The invention relates generally to data processing systems and, more particularly, to communications between data processors in a data processing system.

BACKGROUND OF THE INVENTION

In conventional data processing systems including a plurality of data processors which communicate with one another, such communication is often controlled by an interrupt mechanism. For example, if a first data processor wishes to communicate with a second data processor, the first data processor applies to the second data processor an interrupt signal which interrupts the second data processor. Conversely, if the second data processor wishes to communicate with the first data processor, then the second data processor applies to the first data processor an interrupt signal which interrupts the second data processor. Each of the data processors typically includes an interrupt service routine which then handles the requested communication.

Execution of the interrupt service routines disadvantageously adds overhead processing to the processing loads of the data processors. In addition, servicing an interrupt can be particularly disadvantageous if the interrupted data processor has a pipelined data processing architecture.

It is therefore desirable to reduce the amount of interrupt activity involved in controlling communications between data processors.

According to the invention, a first data processor will interrupt a second data processor for communication therewith only if the first data processor determines that I/O is blocked on the second data processor. By using the indication of whether or not I/O is blocked on the second data processor, the first data processor can advantageously avoid interrupting the second data processor unnecessarily.

DETAILED DESCRIPTION

Figure 1:
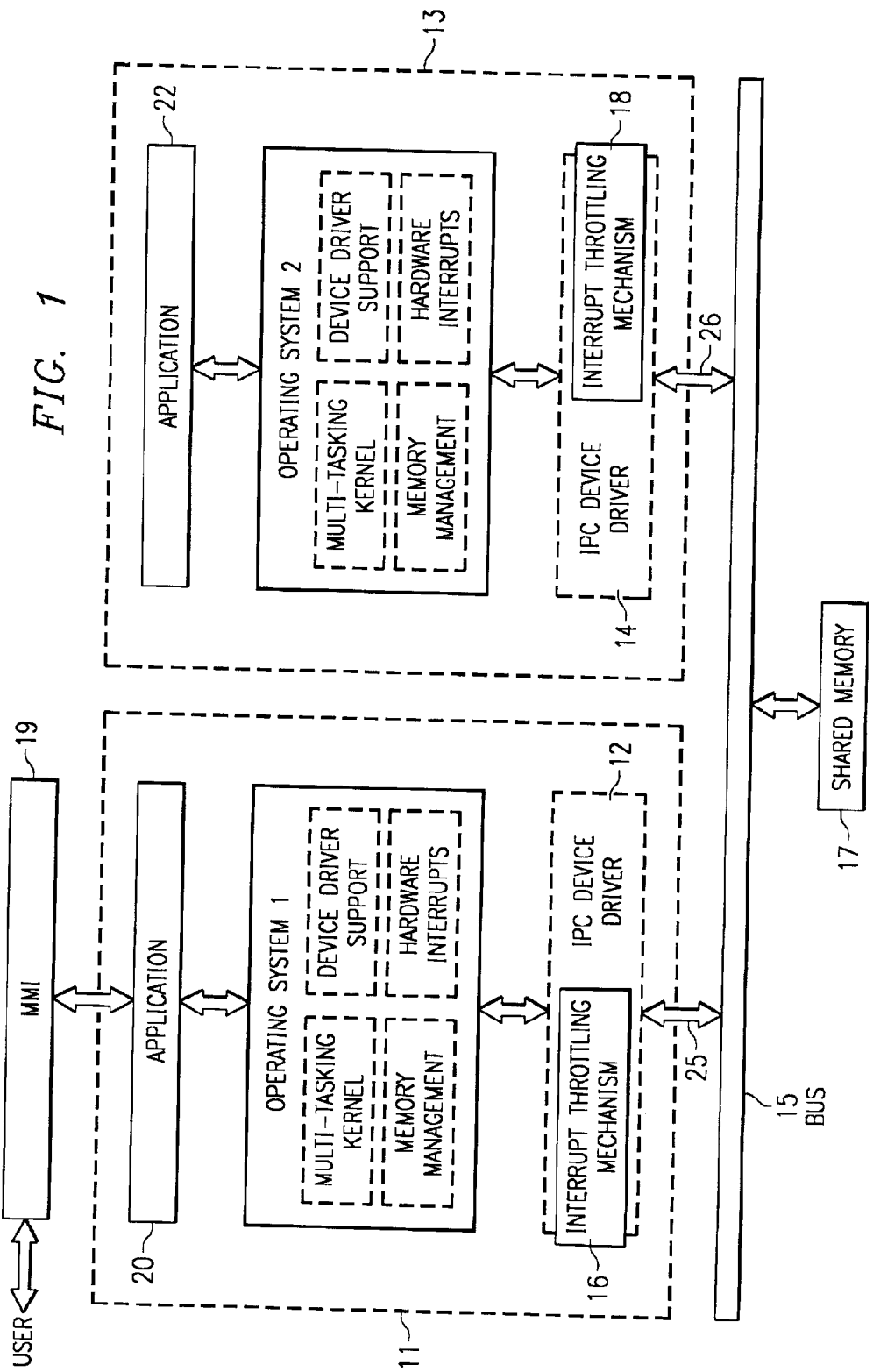
FIG. 1 diagrammatically illustrates exemplary embodiments of a data processing system according to the invention.

FIG. 1 diagrammatically illustrates exemplary embodiments of a data processing system according to the invention. The exemplary system of FIG. 1 includes first and second data processors 11 and 13 coupled for communication with one another via respective communication ports 25 and 26, a bus 15 and a shared memory resource 17. In one exemplary embodiment, the data processor 11 can be a general purpose microprocessor (e.g. x86 or ARM), and the data processor 13 can be a special purpose data processor such as a digital signal processor (DSP). The data processors in FIG. 1 utilize respective multi-tasking operating systems that are capable of inter-processor signaling, such as generation and handling of inter-processor hardware interrupts. Access to the shared memory 17 can be arbitrated sufficiently to provide each processor with exclusive access to the shared memory, as described in further detail below.

As shown in FIG. 1, the operating systems of the respective data processors 11 and 13 each include a multi-tasking kernel, memory management, hardware interrupts and device driver support. Each processor also includes an inter-processor communication (IPC) device driver. The IPC device driver 12 of the data processor 11 implements an interrupt throttling mechanism 16, and the IPC device driver 14 of the data processor 13 implements an interrupt throttling mechanism 18. The IPC device driver of each data processor uses its associated interrupt throttling mechanism to limit, or throttle, generation of IPC-related interrupts to the other data processor. By operation of the interrupt throttling mechanisms, the data processing overhead incurred by the IPC device drivers for handling incoming interrupts is reduced.

Figure 2:
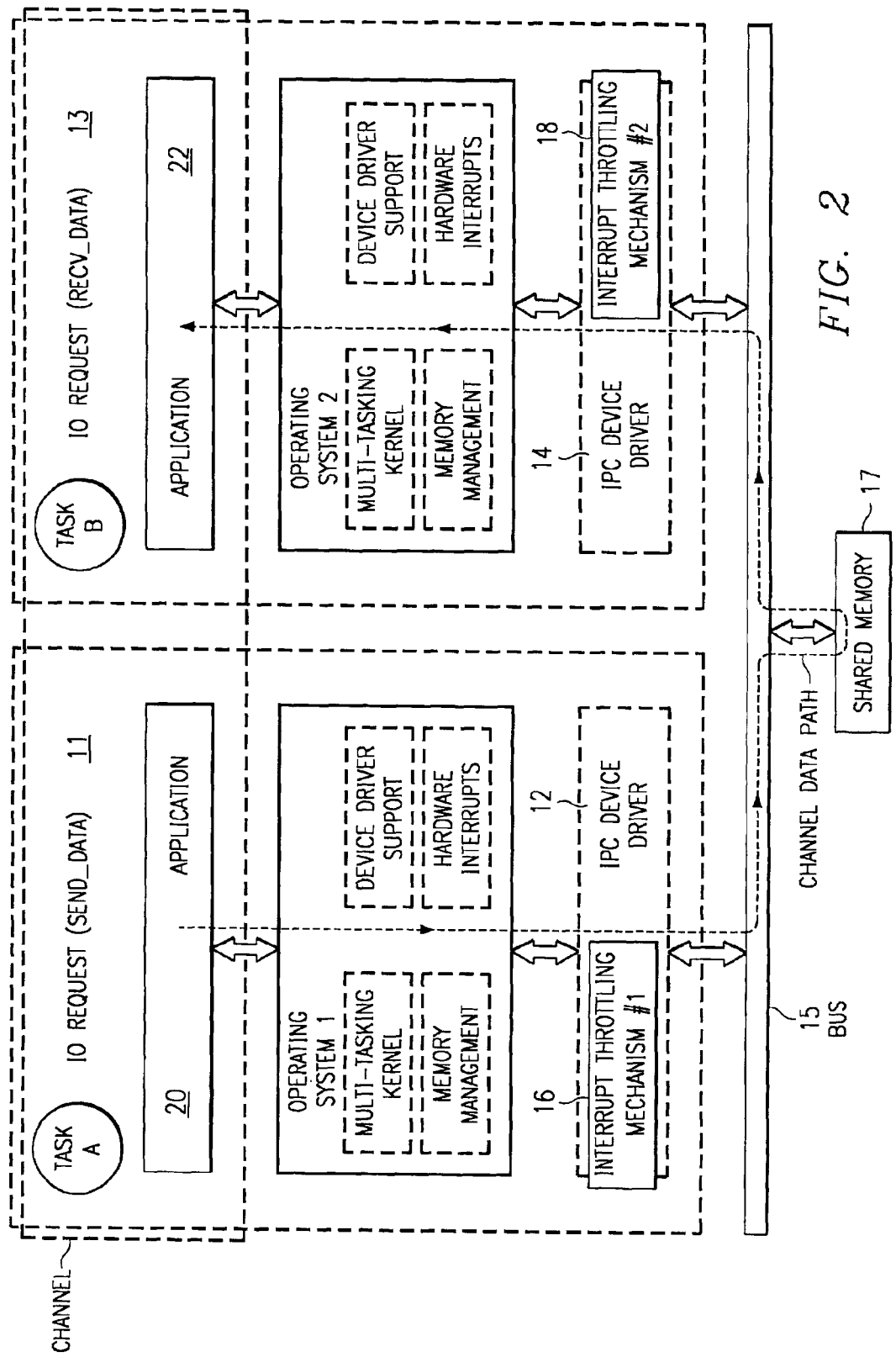
FIG. 2 is similar to FIG. 1, and includes a conceptual illustration of a data communication channel between the data processors of FIG. 1.

FIG. 1 further illustrates an application running on each of the data processors. These applications 20 and 22 communicate with one another via a communication channel data path as illustrated in FIG. 2. The communication channel between the applications is illustrated conceptually within the broken lines of FIG. 2. The actual physical data path passes through the shared memory 17 as illustrated. Referring again to the example of FIG. 1, a man/machine interface (MMI) 19 is coupled to the data processor 11 for permitting a user to communicate with the application currently running on the data processor 11. As shown in FIG. 2, a task A is associated with the application 20 on data processor 11, and a task B is associated with the application 22 on data processor 13. A task is a thread of execution that can be in various states in accordance with the associated data processor's operating system. The operating system kernel of each data processor has the ability to block, i.e. is suspend, thread execution in the IPC device driver of that data processor. Also, the IPC device driver of each data processor has the ability to be signaled or interrupted by the other data processor, and each PC device driver has access to the shared memory 17.

Figure 3:
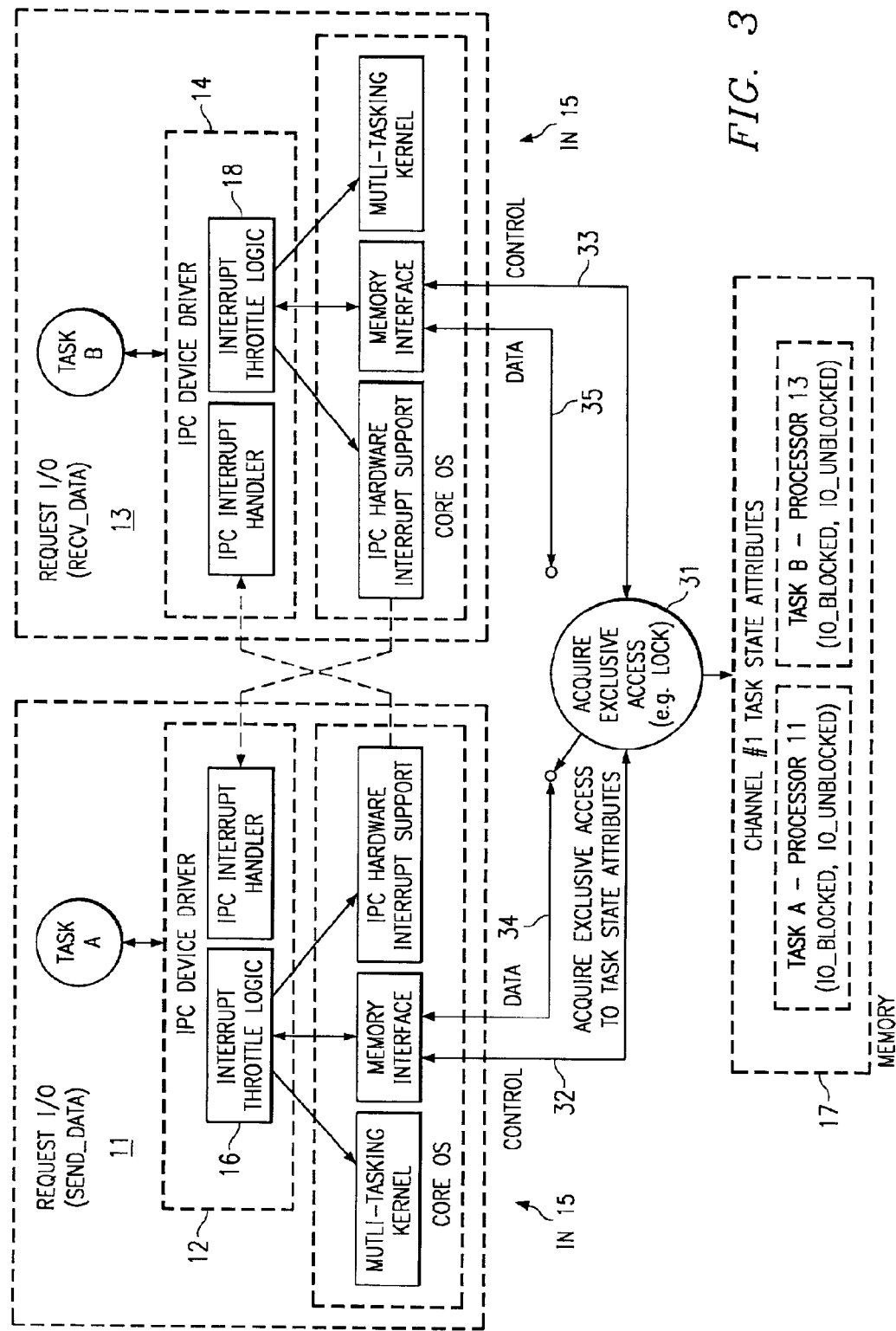
FIG. 3 illustrates in more detail the use and control of the shared memory of FIG. 1 according to the invention.

FIG. 3 diagrammatically illustrates exemplary interfaces between the shared memory 17 and data processors 11 and 13. As shown in FIG. 3, each of the data processors 11 and 13 can acquire exclusive access to task state attributes stored in the shared memory 17. In the example of FIG. 3, such exclusive access is accomplished by appropriately controlling a memory access apparatus 31, illustrated in FIG. 3 as a data switch 31. For example, if the data processor 11 wishes to obtain exclusive access to the task state attributes stored in memory 17, the data processor 11 provides, via its memory interface, control signaling at 32 to cause the data switch 31 to assume the position illustrated in FIG. 3. With the data switch in this configuration, the data processor 11 can access the shared memory 17 via the data path 34, and the data processor 13 is prevented from accessing the shared memory 17. Similarly, when the data processor 13 wishes to acquire exclusive access to the task state attributes in the shared memory 17, the memory interface of data processor 13 outputs appropriate control signaling at 33 to cause the data switch 31 to disconnect the data path 34 from the shared memory 17 and connect the data path 35 to the shared memory 17.

As illustrated in FIG. 3, the shared memory 17 includes task I/O state attributes corresponding to task A on processor 11 and task B on processor 13. The task I/O state attribute of a given task does not necessarily represent the actual instantaneous operating system state of the task, but does indicate at least that the task is immediately going to block on, for example channel #1, or is immediately going to be unblocked with respect to channel #1 by an IPC interrupt. (This will become apparent from the description of FIG. 4 hereinbelow.) The IPC device driver of each data processor can access the channel I/O attributes. Each IPC device driver includes interrupt throttle logic to implement its interrupt throttling mechanism.

Also shown in FIG. 3 are IPC interrupt handlers in the IPC device drivers 12 and 14, and IPC hardware interrupt support portions in the operating systems of the data processors 11 and 13. Each data processor can thus interrupt and be interrupted by the other data processor, as described in more detail below.

Figure 4:
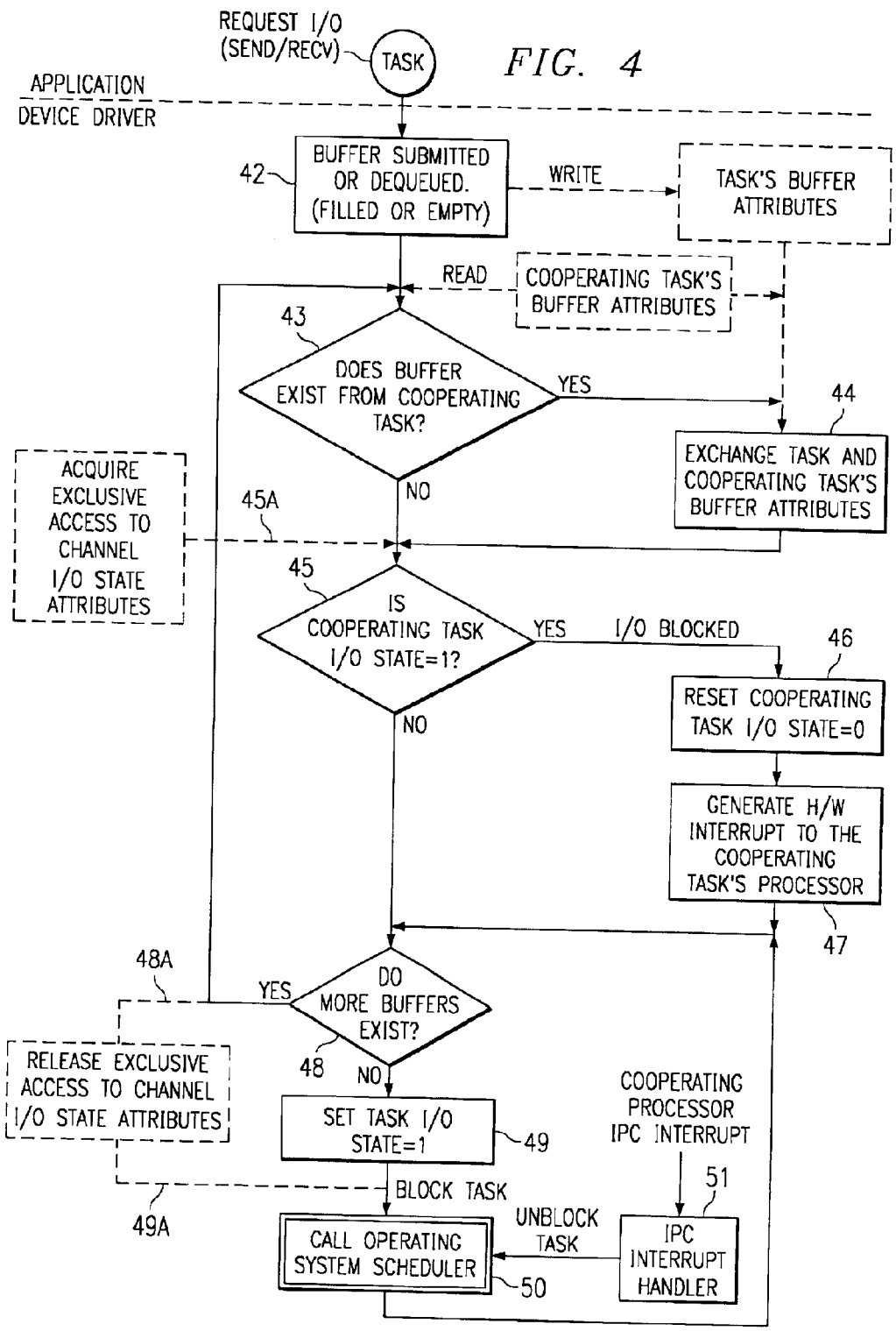
FIG. 4 illustrates exemplary operations which can be performed by the embodiments of FIGS. 1–3.

FIG. 4 illustrates exemplary operations which can be performed by either of the data processors 11 and 13 of FIGS. 1–3 when one of tasks A and B (see also FIGS. 2 and 3) wishes to communicate with the other of tasks A and B. A given application task will request I/O to send data to or receive data from a cooperating task on the other (cooperating) data processor. At 42, buffers are either passed into the device driver or removed from a device queue. If it is determined at 43 that buffer attributes from the cooperating task on the other data processor exist in the shared memory 17, buffer data and attributes can be exchanged at 44 in order to execute a data exchange. This can be accomplished, for example, by swapping buffer data and attributes, or by copying buffer data and attributes, both of which are well known conventional procedures for implementing inter-processor communications through a shared memory resource.

After having acquired exclusive access to the task I/O state attributes in the shared memory 17 (see 45A), the task I/O state of the other data processor is determined at 45. If the task I/O state attribute in the shared memory indicates that the cooperating data processor is blocked, then the task I/O state attribute for the cooperating task is set to 0 (unblocked) in shared memory at 46, after which a hardware interrupt to the cooperating data processor is generated at 47. If the task I/O state attribute at 45 indicates that the cooperating task is not blocked, or after generating the hardware interrupt at 47, it is determined at 48 whether more buffers exist. If so, then operations return to block 43. When it is determined at 48 that no more buffers exist (buffer exchange can continue until either processor is out of data buffers), the data processor sets its own task I/O state attribute to a value of 1 (blocked) at 49, thereby indicating that its task is blocked. Thereafter at 50, the operating system scheduler of the multi-tasking kernel is called to block the task. Note also that the data processor releases its exclusive shared memory access either after setting its own task I/O state to a value of 1 at 49 (see 49A) or after determining that more buffers exist at 48 (see 48A).

FIG. 4 also indicates how the device driver responds to an IPC interrupt received from the cooperating processor. As illustrated in FIG. 4, the IPC interrupt handler in the IPC device driver receives the IPC interrupt at 51, after which the operating system scheduler is called at 50 to unblock the task in response to the IPC interrupt. Operations proceed to block 48 after the scheduler blocks or unblocks the task at 50.

As illustrated in FIGS. 1–4, if a task running on the data processor 11, for example, wishes to communicate with a cooperating task running on the data processor 13, the data processor 11 will generate a hardware interrupt to the data processor 13 only if the data processor 11 determines that the I/O state of the cooperating task on data processor 13 is (or is about to be) blocked. In this manner, the data processor 13 is interrupted only when necessary, i.e. only when the cooperating task is blocked. This avoids unnecessary interruption of the data processor 13, thereby advantageously reducing the interrupt handling overhead on data processor 13.

Although the exemplary embodiments of FIGS. 1–3 illustrate only two data processors, it will be apparent to workers in the art that the interrupt throttling mechanism according to the invention is applicable to communications between any two data processors. Accordingly, the interrupt throttling mechanism of, for example, data processor 11 can be utilized in conjunction with communications between data processor 11 and other data processors (not explicitly shown) which can also gain exclusive access to the shared memory 17. In some exemplary embodiments of the invention, all components (except MMI 19) of FIGS. 1–3 can be embedded together in a single integrated circuit and, in other embodiments, one or more of these components can be provided on an integrated circuit separately from the remaining components.

Referring again to FIG. 1, the man/machine interface (MMI) 19 permits a user to communicate with the application 20. Examples of the man/machine interface 19 include a keyboard/keypad, a visual display, etc. Examples of the system of FIGS. 1–3 include a cellular telephone, a laptop computer and a set-top box.

It will also be evident to workers in the art that the systems of FIGS. 1–3 could also be implemented with the interrupt throttling mechanism provided on only one of the data processors. For example, it is possible to throttle interrupts to only one of the data processors, such as the data processor 13. This could be advantageous, for example, if the system hardware limits the ability to provide exclusive access to the shared memory. If an exclusive access mechanism such as shown at 31 in FIG. 3 is not available, then the data processor 11 could use, for example, a read-modify-write (RMW) bus cycle to atomically "test-and-set" the respective I/O state attributes of the two tasks.

Although exemplary embodiments of the invention are described above in detail, this does not limit the scope of the invention, which can be practiced in a variety of embodiments.

What is claimed is:

1. A method for implementing communication between data processors, comprising:

a first task running on a first data processor determining that communication is desired between the first task and a second task running on a second data processor;

the first data processor determining whether the second task is blocked with respect to communication on a predetermined communication channel;

if the second task is blocked with respect to communication on the predetermined communication channel, the first data processor interrupting the second data processor to inform the second data processor of the desired communication and thereafter participating in the desired communication on the predetermined communication channel; and if the second task is not blocked with respect to communication on the predetermined communication channel, the first data processor participating in the desired communication on the predetermined communication channel without interrupting the second data processor.

2. The method of claim 1, including, if the second task is blocked with respect to communication on the predetermined communication channel, the first data processor providing in a memory shared by the first and second data processors an indication that the second data processor is not blocked with respect to communication on the predetermined communication channel.

3. The method of claim 2, including the second data processor unblocking the second task with respect to communication on the predetermined communication channel in response to said interrupting step.

4. The method of claim 1, wherein said determining step includes the first data processor accessing a memory that is shared by the first and second data processors.

5. The method of claim 4, wherein said determining step includes the first data processor obtaining exclusive access to the shared memory.

6. The method of claim 5, wherein said determining step includes the first data processor retrieving from the shared memory information indicative of whether the second task is blocked with respect to communication on the predetermined communication channel.

7. The method of claim 1, wherein said participating step includes the first task exchanging data buffer attributes with the second task.

8. The method of claim 7, wherein said participating step includes the first task swapping buffer data and buffer attributes with the second task.

9. The method of claim 7, wherein said participating step includes the first task copying from data buffers data provided by the second task, and the first task copying attributes associated with said data buffers.

10. The method of claim 1, including, after said participating step, the first data processor blocking the first task with respect to communication on said predetermined communication channel and providing in a memory shared by the first and second data processors an indication that the first task is blocked with respect to communication on it the predetermined communication channel.

11. The method of claim 10, including the second data processor interrupting the first data processor to indicate that communication is desired between the second task and the first task, and the first data processor unblocking the first task for communication on the predetermined communication channel in response to said interrupting step.

12. The method of claim 10, including the second data processor, in conjunction with said interrupting step, providing in a memory shared by the first and second data processors an indication that the first data processor is not blocked with respect to communication on the predetermined communication channel.

13. A data processing system, comprising:
a first data processor;
a second data processor coupled to said first data processor for permitting communication therebetween;
said first data processor including a device driver for implementing a desired communication between a first task running on said first data processor and a second task running on said second data processor;
a communication port coupled to said device driver for permitting said device driver to access a communication channel for the desired communication, said communication port further for permitting said device driver to receive information indicative of whether the second task is blocked with respect to communication on said communication channel; and said device driver including logic responsive to a blocked indication for outputting to said second data processor via said communication port an interrupt signal to inform said second data processor of the desired communication, said logic responsive to an indication that the further task is not blocked for permitting said device driver to participate in the desired communication on said communication channel without outputting said interrupt signal to said second data processor.

14. The system of claim 13, wherein said communication channel includes a memory apparatus shared by said first and second data processors.

15. The system of claim 14, wherein said shared memory apparatus includes said information indicative of whether said second task is blocked, said communication port of said first data processor coupled to said shared memory apparatus for permitting said device driver of said first data processor to access said information indicative of whether said second task is blocked.

16. The system of claim 15, including a memory access apparatus coupled between said shared memory apparatus and said first and second data processors, said memory access apparatus responsive to signaling from said first data processor for permitting said device driver of said first data processor to access said shared memory while simultaneously excluding said second data processor from accessing said shared memory.

17. The system of claim 13, wherein said first data processor includes a scheduler for selectively blocking and unblocking said first task with respect to communication on said communication channel, said device driver coupled to said scheduler and operable after performing the desired communication for signaling said scheduler to block said first task with respect to communication on said communication channel, and wherein said communication channel includes a memory apparatus shared by said first and second data processors, said device driver further operable after performing the desired communication for storing in said shared memory apparatus an indication that said first task is blocked with respect to communication on said communication channel.

18. The system of claim 17, wherein said communication port of said first data processor is coupled to said second data processor for receiving therefrom an interrupt signal, said device driver of said first data processor responsive to said interrupt signal for signaling said scheduler to unblock said first task.

19. The system of claim 13, including a memory apparatus coupled to said first and second data processors, said device driver of said first data processor responsive to said blocked indication for providing within said memory apparatus an indication that said second task is not blocked with respect to communication on said communication channel.

20. The system of claim 19, wherein said second data processor is coupled to said communication port of said first data processor for providing an interrupt signal to said device driver, said second data processor operable in conjunction with providing said interrupt signal to said device driver for also providing in said memory apparatus an indication that said first task is not blocked with respect to communication on said communication channel.

21. The system of claim 20, wherein said first data processor includes a scheduler for selectively blocking and unblocking said first task with respect to communication on said communication channel, said device driver coupled to said scheduler and responsive to said interrupt signal for signaling said scheduler to unblock said first task with respect to communication on said communication channel.

22. The system of claim 21, including a memory access apparatus coupled to said memory apparatus and said first and second data processors, said memory access apparatus responsive to signaling from said first data processor for permitting said first data processor to access said memory apparatus while simultaneously preventing said second data processor from accessing said memory apparatus, and said memory access apparatus responsive to signaling from said second data processor for permitting said second data processor to access said memory apparatus while simultaneously preventing said first data processor from accessing said memory apparatus.

23. The system of claim 22, wherein said memory access apparatus includes a data switch.

24. The system of claim 22, provided on a single integrated circuit chip.

25. The system of claim 24, including a man/machine interface coupled to said first data processor for permitting communication between said first data processor and a user.

26. The system of claim 13, provided on a single integrated circuit chip.

27. The system of claim 13, including a man/machine interface coupled to said first data processor for permitting communication between said first data processor and a user.

28. The system of claim 13, wherein said first data processor is a microprocessor and said second data processor is a digital signal processor.

29. A data processing apparatus, comprising:
 a device driver for implementing a desired communication between a task running on the data processing apparatus and a further task running on a further data processing apparatus;
 a communication port coupled to said device driver for permitting said device driver to access a communication channel on which the desired communication can occur, said communication port further for permitting said device driver to receive information indicative of whether the further task is blocked with respect to communication on said communication channel; and
 said device driver including logic responsive to a blocked indication for outputting to the further data processing apparatus an interrupt signal to inform the further data processing apparatus of the desired communication, said logic responsive to an indication that the further task is not blocked for permitting said device driver to participate in the desired communication on said communication channel without outputting said interrupt signal to the further data processing apparatus.

30. The apparatus of claim 29, including a scheduler for selectively blocking and unblocking said first-mentioned task with respect to communication on said communication channel, said device driver coupled to said scheduler and operable after performing the desired communication for signaling said scheduler to block said first-mentioned task with respect to communication on said communication channel.

31. The apparatus of claim 29, wherein said communication port is further for receiving an interrupt signal from the further data processing apparatus, said device driver responsive to said interrupt signal for signaling said scheduler to unblock said first-mentioned task with respect to communication on said communication channel.

* * * * *